United States Patent
John et al.

(10) Patent No.: US 9,560,523 B2
(45) Date of Patent: Jan. 31, 2017

(54) MOBILE DEVICE AUTHENTICATION

(71) Applicant: General Electric Company, Schenectady, NY (US)

(72) Inventors: Justin Varkey John, Cohoes, NY (US); Robert William Grubbs, Blue Ridge, VA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 271 days.

(21) Appl. No.: 13/974,099

(22) Filed: Aug. 23, 2013

(65) Prior Publication Data
US 2015/0058947 A1 Feb. 26, 2015

(51) Int. Cl.
*G06F 7/04* (2006.01)
*H04W 12/06* (2009.01)
(Continued)

(52) U.S. Cl.
CPC .......... *H04W 12/06* (2013.01); *H04L 63/0209* (2013.01); *H04W 4/001* (2013.01); *H04W 4/021* (2013.01); *G05B 19/0425* (2013.01); *G05B 19/418* (2013.01); *G05B 2219/23067* (2013.01); *G05B 2219/36133* (2013.01); *G06F 2221/2141* (2013.01); *H04L 63/062* (2013.01); *H04L 63/104* (2013.01); *H04L 63/108* (2013.01); *H04L 67/12* (2013.01); *H04W 12/04* (2013.01)

(58) Field of Classification Search
CPC .............................. H04W 12/06; H04W 4/021
USPC ..................................................... 726/26–30
See application file for complete search history.

(56) References Cited

U.S. PATENT DOCUMENTS

2007/0101406 A1* 5/2007 Zavalkovsky ...... H04L 63/0815
726/4
2007/0239870 A1* 10/2007 Kennedy ................ G01D 4/002
709/224
(Continued)

OTHER PUBLICATIONS

Dinita et al., "A cloud-based virtual computing laboratory for teaching computer networks," Optimization of Electrical and Electronic Equipment (OPTIM), 2012 13th International Conference on Year: 2012 pp. 1314-1318.*

(Continued)

*Primary Examiner* — Roderick Tolentino
(74) *Attorney, Agent, or Firm* — GE Global Patent Operation; Scott R. Stanley

(57) ABSTRACT

One aspect of the invention is a system for mobile device authentication. The system includes a public-facing server configured to interface with a mobile device. The system also includes a secure server configured to interface with the public-facing server and an authorization station. The authorization station includes processing circuitry configured to establish authorization limits for the mobile device and generate an authentication key associated with the authorization limits. The processing circuitry is further configured to provide the authentication key and an identifier of the mobile device to the secure server, and generate an authorization code including an encoded version of the authentication key and an address of the public-facing server. The processing circuitry is also configured to provide the authorization code to the mobile device to establish authentication for the mobile device to receive data from a control system network as constrained by the authorization limits.

14 Claims, 6 Drawing Sheets

(51) Int. Cl.
*H04L 29/06* (2006.01)
*H04W 4/00* (2009.01)
*H04W 4/02* (2009.01)
*G05B 19/418* (2006.01)
*H04W 12/04* (2009.01)
*H04L 29/08* (2006.01)
*G05B 19/042* (2006.01)

(56) References Cited

U.S. PATENT DOCUMENTS

| | | |
|---|---|---|
| 2008/0082646 A1 | 4/2008 | Shenfield et al. |
| 2010/0163613 A1 | 7/2010 | Bucher et al. |
| 2012/0020297 A1* | 1/2012 | Cecchini ................. H04W 4/00 370/328 |
| 2012/0287290 A1 | 11/2012 | Jain |
| 2013/0031261 A1 | 1/2013 | Suggs |
| 2013/0097315 A1* | 4/2013 | Hao ................... H04N 21/2541 709/225 |
| 2013/0219479 A1* | 8/2013 | DeSoto ................. H04W 12/06 726/6 |
| 2013/0233916 A1* | 9/2013 | Tran ........................ G06F 17/30 235/375 |
| 2014/0014821 A1* | 1/2014 | Kawahito ............... H03M 1/18 250/208.1 |
| 2014/0173695 A1* | 6/2014 | Valdivia .................. G06F 21/36 726/4 |
| 2014/0237236 A1* | 8/2014 | Kalinichenko ......... G06F 21/43 713/168 |
| 2014/0282961 A1* | 9/2014 | Dorfman ............. H04L 63/0823 726/7 |

OTHER PUBLICATIONS

Acharya et al., "Secure Electronic Health Record Exchange: Achieving the Meaningful Use Objectives," System Sciences (HICSS), 2013 46th Hawaii International Conference on Year: 2013 pp. 2555-2564.*

* cited by examiner

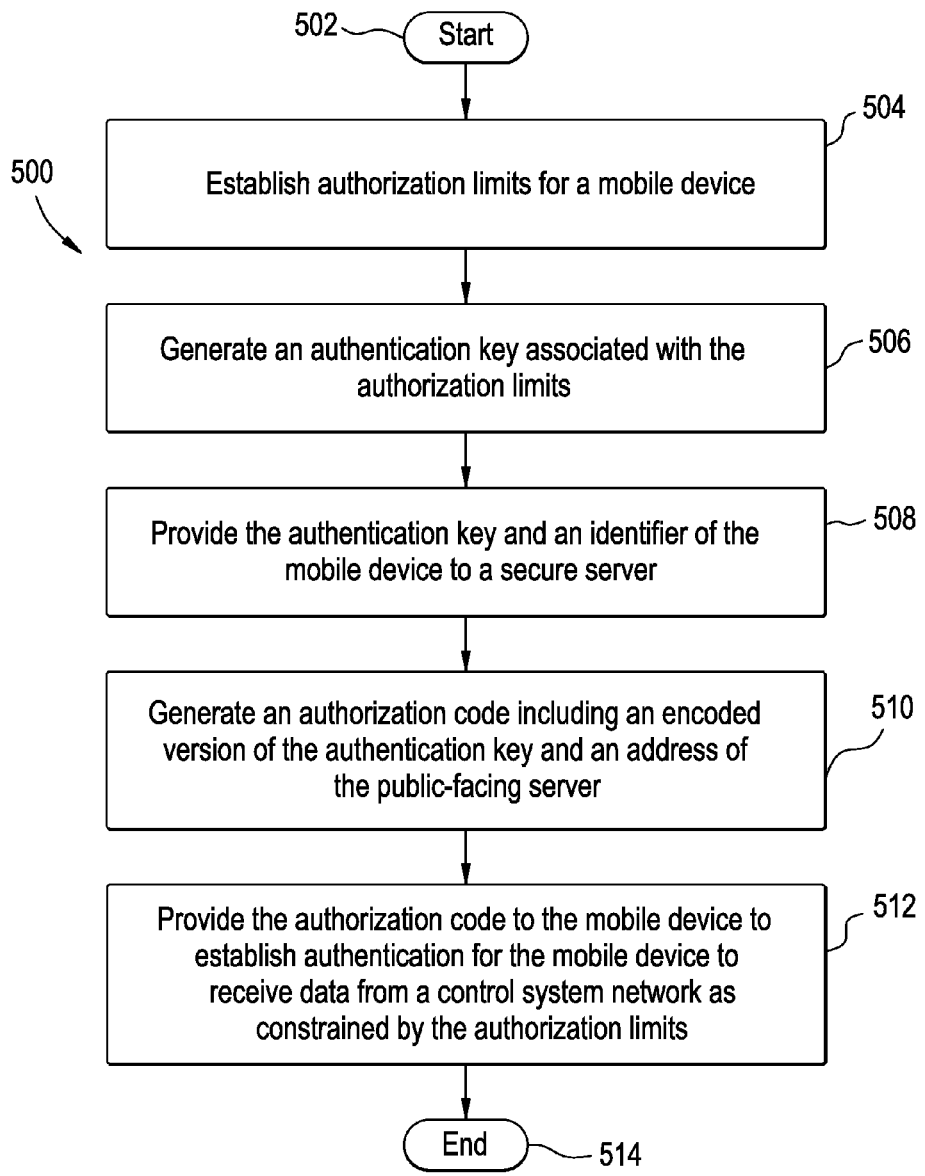

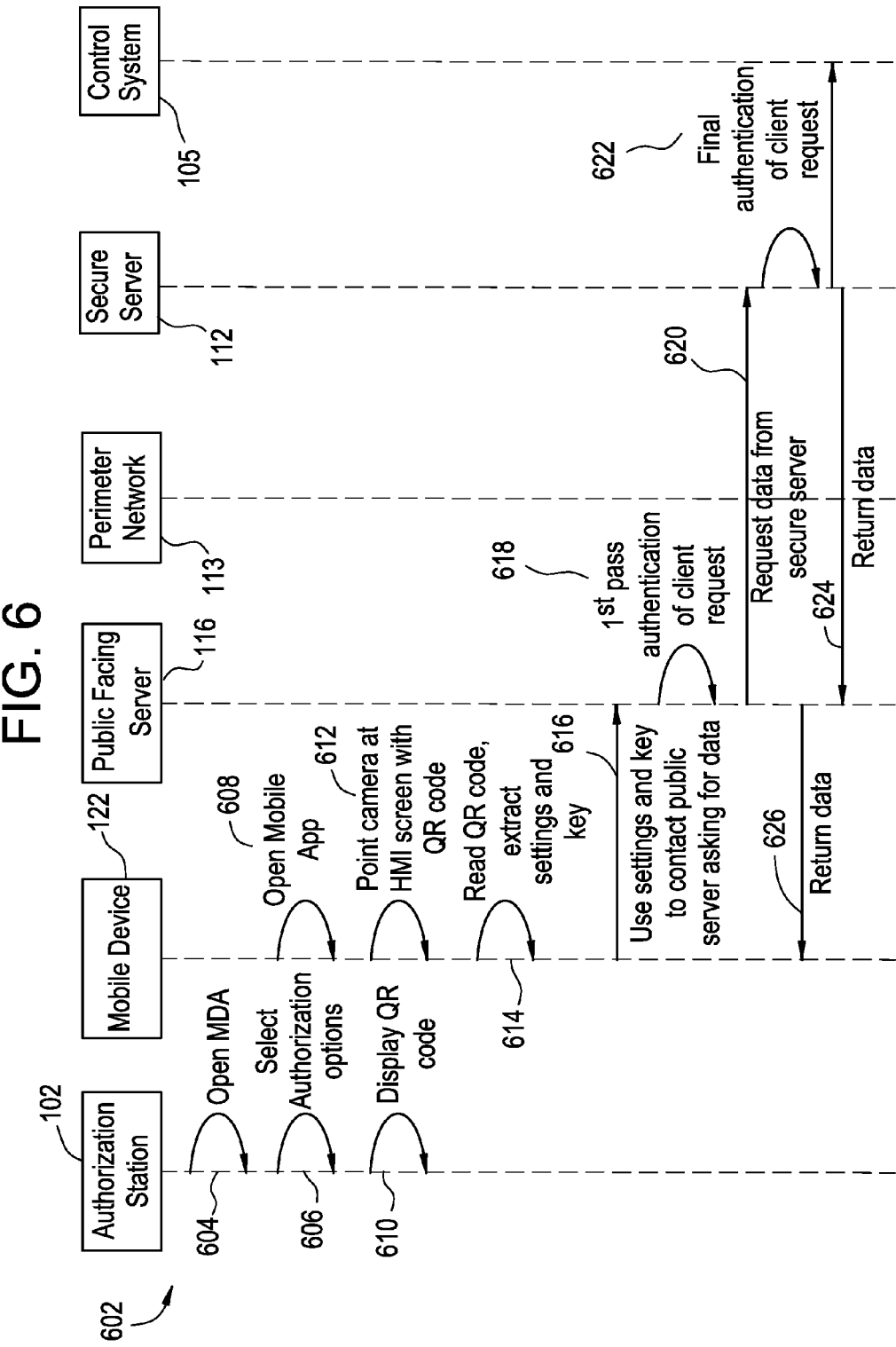

MOBILE DEVICE AUTHENTICATION

BACKGROUND OF THE INVENTION

The subject matter disclosed herein relates to computer system security, and more particularly, to mobile device authentication.

Maintaining cyber security is critical when allowing computer devices, such as mobile devices, to connect to a secured computing environment. Secured computing environments that contain sensitive information or systems must limit access to devices that are not authorized or trusted. Users that connect devices to a secured computing environment may not need full access to all of the resources of the secured computing environment. Providing limited access to connected devices based on user-specific access rights may be performed using a secured protocol. A secured protocol can provide broad access constraints but typically does not provide fine grained control over specific access limits or support device specific constraints. Failure to properly manage connections between a secured computing environment and connected devices can lead to potential security holes that risk compromising integrity of the secured computing environment.

BRIEF DESCRIPTION OF THE INVENTION

One aspect of the invention is a system for mobile device authentication. The system includes a public-facing server configured to interface with a mobile device. The system also includes a secure server configured to interface with the public-facing server via a perimeter network. An authorization station is configured to interface with the secure server via a control system network. The authorization station includes processing circuitry configured to establish authorization limits for the mobile device and generate an authentication key associated with the authorization limits. The processing circuitry is further configured to provide the authentication key and an identifier of the mobile device to the secure server, and generate an authorization code including an encoded version of the authentication key and an address of the public-facing server. The processing circuitry is also configured to provide the authorization code to the mobile device to establish authentication for the mobile device to receive data from the control system network as constrained by the authorization limits.

Another aspect of the invention is a method for mobile device authentication. The method includes establishing, by processing circuitry of an authorization station, authorization limits for a mobile device. The authorization station interfaces with a secure server via a control system network. The secure server interfaces with a public-facing server via a perimeter network, and the public-facing server interfaces with the mobile device. The processing circuitry generates an authentication key associated with the authorization limits. The authentication key and an identifier of the mobile device are provided to the secure server. An authorization code is generated that includes an encoded version of the authentication key and an address of the public-facing server. The authorization code is provided to the mobile device to establish authentication for the mobile device to receive data from the control system network as constrained by the authorization limits.

Another aspect of the invention is a computer program product for mobile device authentication. The computer program product includes a non-transitory computer readable medium storing instructions for causing processing circuitry to implement a method. The method includes establishing authorization limits for a mobile device, and generating an authentication key associated with the authorization limits. The authentication key and an identifier of the mobile device are provided to a secure server. An authorization code is generated including an encoded version of the authentication key and an address of a public-facing server. The authorization code is provided to the mobile device to establish authentication for the mobile device to receive data from a control system network as constrained by the authorization limits.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 5 depicts a process for providing mobile device authentication in accordance with exemplary embodiments; and FIG. 6 depicts an example sequence diagram for providing mobile device authentication and retrieving data in accordance with exemplary embodiments.

The detailed description explains embodiments of the invention, together with advantages and features, by way of example with reference to the drawings.

DETAILED DESCRIPTION OF THE INVENTION

Figure 1:
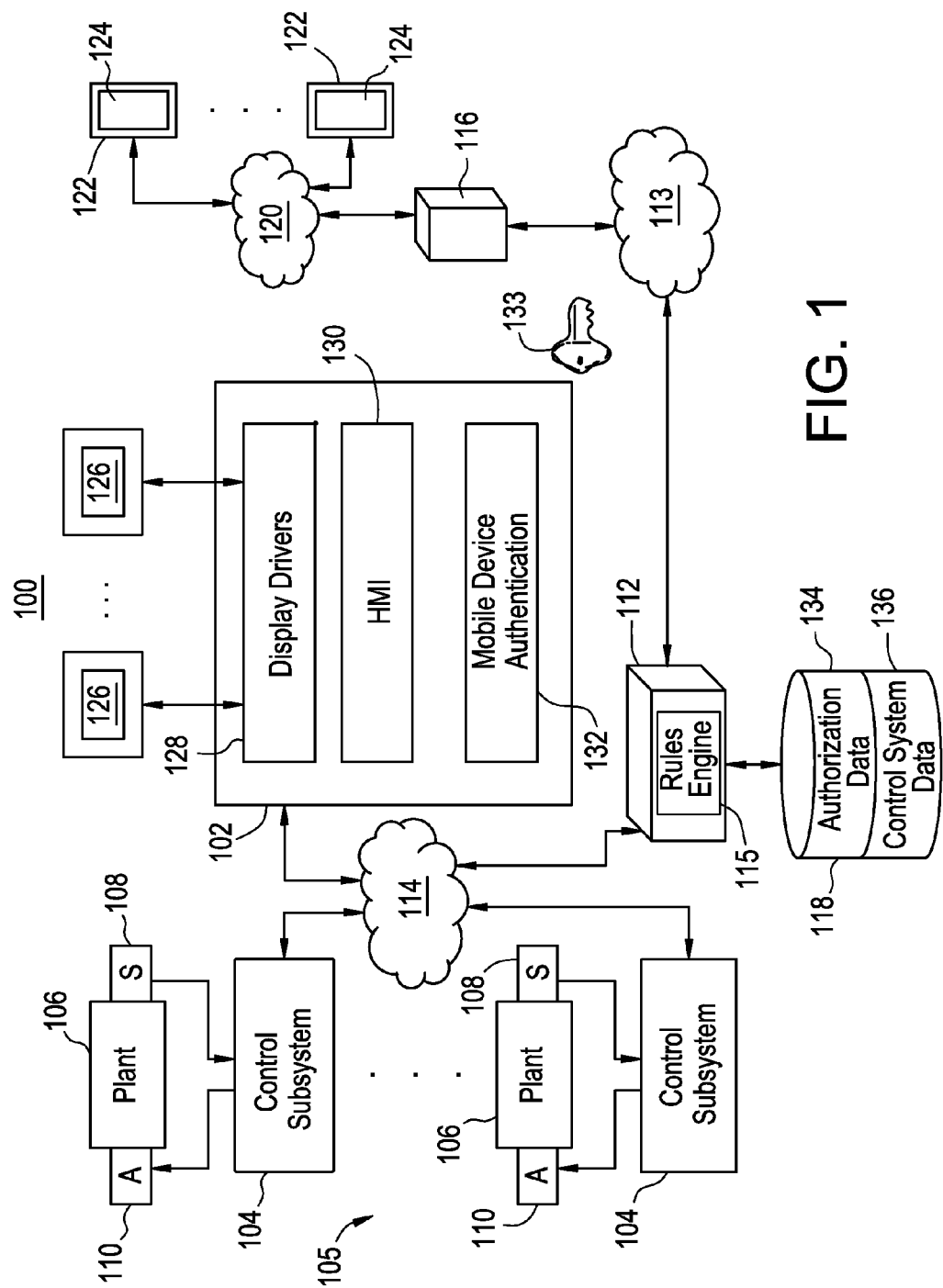
FIG. 1 depicts an exemplary embodiment of a secured computing environment.

FIG. 1 illustrates an exemplary control system environment 100 for accessing, controlling, and monitoring a number of control system assets. For illustrative purposes a power plant is described herein. The control system environment 100 is an example of a secured computing environment. It will be appreciated that the systems and methods described herein can be applied to any type of environment that includes a perimeter network, i.e., a demilitarized zone (DMZ), that interfaces to one or more mobile devices which must be authenticated.

In the example of FIG. 1, an authorization station 102 interfaces via a control system network 114 with a control system 105 including a plurality of control subsystems 104. The control system 105 can also include any data or applications needed to operate, monitor, and maintain the control subsystems 104. Each of the control subsystems 104 controls a plant 106 through a combination of sensors 108 and actuators 110. The term "plant" is used generically to describe a device, machine, or subsystem being controlled. Each plant 106 may itself be a system that includes a number of subsystems. For example, the plant 106 may include a gas turbine engine (not depicted) with sensors 108 and actuators 110 distributed between a generator subsystem, an inlet subsystem, a compressor subsystem, a fuel subsystem, and a combustion subsystem of the gas turbine engine. Alternatively, each plant 106 can be any type of machine in an industrial control system. The control subsystems 104 may be configured in a hierarchy of multiple levels to perform operations across multiple subsystems or target particular devices.

The authorization station 102 may serve as a control system interface to the control subsystems 104 and authorize other devices, such as mobile devices 122, to receive data from the control system network 114. The authorization station 102 interfaces to a secure server 112 via the control system network 114. The secure server 112 limits retrieval of data from the control system network 114 to requests from authorized and authenticated users and devices. The secure server 112 can include a rules engine 115 and also interfaces to a storage system 118. The storage system 118 can include fixed or removable media, and may be accessible to or integrated with the secure server 112. The secure server 112 communicates with a public-facing server 116 via a perimeter network 113. The public-facing server 116 can also communicate through a public network 120 to one or more mobile devices 122. In exemplary embodiments, the public network 120 includes one or more wireless links. The mobile devices 122 may respectively include multi-touch displays 124 that enable touchscreen-based navigation and access to elements within the control system environment 100 upon authorization and authentication of the mobile devices 122.

The public network 120 is isolated from the perimeter network 113 and the control system network 114 to maintain a high level of security over control and data access operations in the control system environment 100. The public-facing server 116 can send requests to the secure server 112 via one-way communication and receives responses and results from the secure server 112 using one-way communication with a different protocol. Custom requests and responses for mobile device authentication and specific data needs of the mobile devices 122 can be defined in the protocols used between the secure server 112 and the public-facing server 116. Data request commands and responses are vetted for regulatory compliance and may have limitations imposed by the protocols of the perimeter network 113.

The authorization station 102 interfaces locally to one or more displays 126 via display drivers 128. The displays 126 can be large form factor displays, i.e., non-mobile device displays, and may be configured to receive touch-based input. For example, the displays 126 can be mounted vertically or horizontally to a support structure or integrated within a support structure, such as a touch-sensitive computer table surface. The display drivers 128 produce a variety of interactive user interfaces to support access, control, monitoring, and troubleshooting of the control subsystems 104.

A human-machine interface (HMI) 130 can be implemented on the authorization station 102 or elsewhere within the control system environment 100 to provide control and monitoring of the control subsystems 104. The authorization station 102 also includes a mobile device authentication application 132. The mobile device authentication application 132 establishes authorization limits for the mobile devices 122. For each user and device combination for the mobile devices 122, the mobile device authentication application 132 generates an authentication key 133 with associated authorization limits and provides the authentication key 133 and an identifier for each of the mobile devices 122 to the secure server 112.

Authentication keys 133 and identifiers can be stored as authorization data 134 in the storage system 118. Authorization limits can limit access of the mobile devices 122 to control system data 136 associated with the control subsystems 104, as well as access to the functions of the HMI 130, and other data in the control system environment 100. The control system data 136 may be stored on the storage system 118 or elsewhere in the control system environment 100 and is accessible via the control system network 114. The mobile device authentication application 132 can generate an authorization code including an encoded version of the authentication key 133 and an address of the public-facing server 116. The authorization code is provided to a corresponding instance of the mobile devices 122 via the public-facing server 116 to establish authentication to receive data from the control system network 114 as constrained by the authorization limits.

The authentication key 133 can be formatted using any known encryption techniques. Although a single instance of the authentication key 133 is depicted in FIG. 1, the authentication key 133 can be formatted as a public/private key set or other key format known in the art.

The mobile device authentication application 132 can configure rules for the rules engine 115 to determine when access should be modified or revoked for each of the mobile devices 122. User and device identifier pairs can be configured with different levels of permissions to view, access, and modify elements and features within the control system environment 100 via the control system network 114. For example, on a particular mobile device 122 a user may only be given access to read certain parameters while blocking access to change states of parameters of the control subsystems 104. The rules engine 115 can monitor access attempts by the user devices to monitor for unusual activity, such as repeated attempts to access unauthorized portions of the control system data 136. The rules engine 115 can also monitor the status of specific signals within the control system data 136 to determine whether an event is detected where authorization for a mobile device 122 should be revoked, such as a failure or fault resulting from commands initiated by the mobile device 122.

Although a number of features are depicted as part of the control system environment 100 and the authorization station 102, it will be understood that various modules can be added or removed within the scope of various embodiments.

Figure 2:
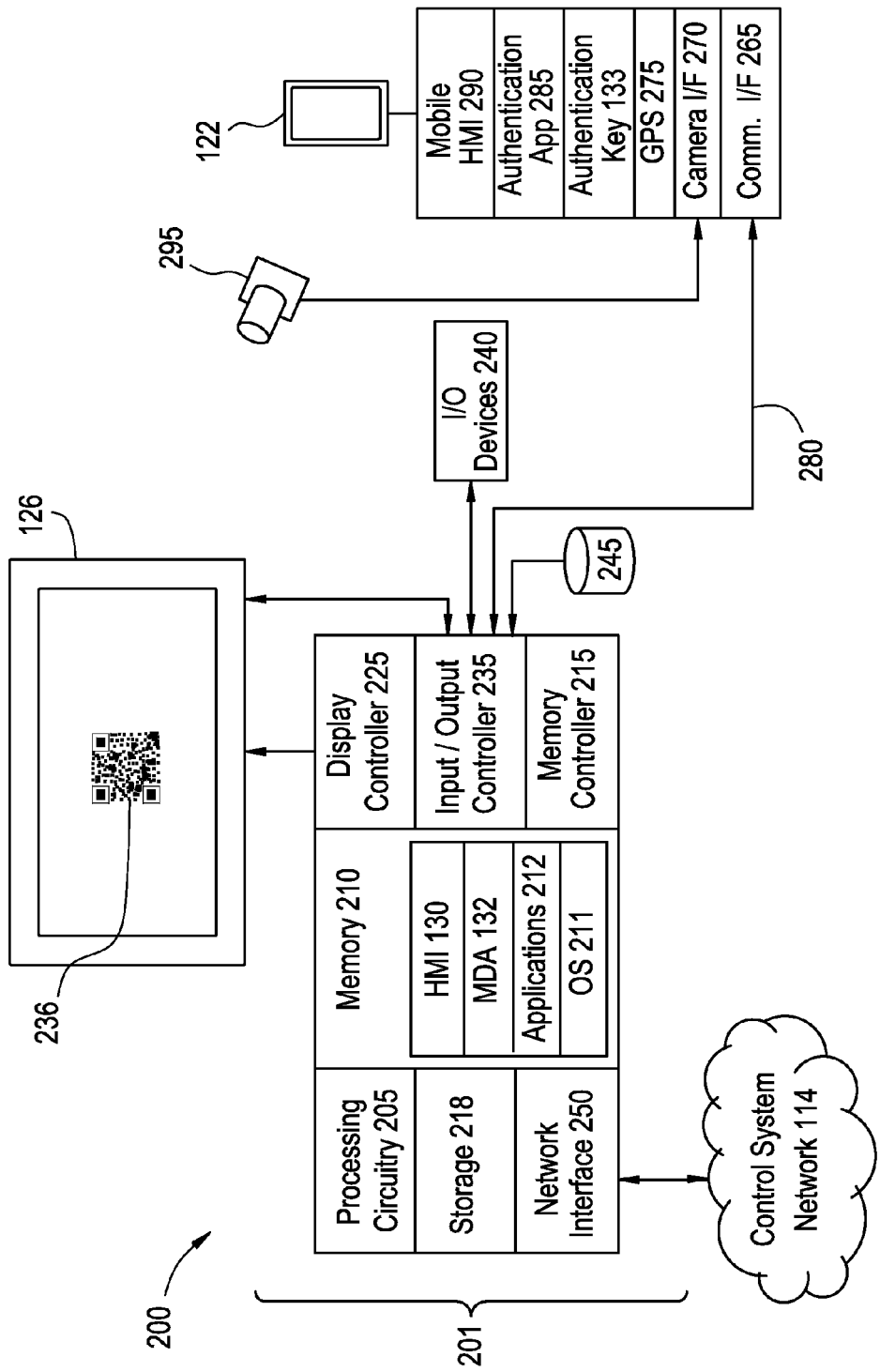
FIG. 2 depicts an exemplary embodiment of a computing system.

FIG. 2 illustrates an exemplary embodiment of a computing system 200 that can be implemented as the authorization station 102 of FIG. 1. The methods described herein can be implemented in software (e.g., firmware), hardware, or a combination thereof. In exemplary embodiments, the methods described herein are implemented in software, as one or more executable programs, and executed by a special or general-purpose digital computer, such as a personal computer, mobile device, workstation, minicomputer, or mainframe computer operably coupled to or integrated with a display. The system 200 therefore includes a processing system 201 interfaced to at least one display 126.

In exemplary embodiments, in terms of hardware architecture, as shown in FIG. 2, the processing system 201 includes processing circuitry 205, memory 210 coupled to a memory controller 215, and one or more input and/or output (I/O) devices 240, 245 (or peripherals) that are communicatively coupled via an input/output controller 235. The input/output controller 235 can be, but is not limited to, one or more buses or other wired or wireless connections, as is known in the art. The input/output controller 235 may have additional elements, which are omitted for simplicity, such as controllers, buffers (caches), drivers, repeaters, and receivers, to enable communications. Further, the input/output controller 235 may include address, control, and/or data connections to enable appropriate communications among the aforementioned components. The processing system 201 can further include a display controller 225 coupled to the display 126. The display controller 225 may drive output to be rendered on the display 126 according to the display drivers 128 of FIG. 1.

The processing circuitry 205 is hardware for executing software, particularly software stored in memory 210. The processing circuitry 205 can include any custom made or commercially available processor, a central processing unit (CPU), an auxiliary processor among several processors associated with the processing system 201, a semiconductor based microprocessor (in the form of a microchip or chip set), a macroprocessor, or generally any device for executing software instructions.

The memory 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, memory card, programmable read only memory (PROM), tape, compact disc read only memory (CD-ROM), digital versatile disc (DVD), disk, diskette, cartridge, cassette or the like, etc.). Moreover, the memory 210 may incorporate electronic, magnetic, optical, and/or other types of storage media. The memory 210 can have a distributed architecture, where various components are situated remote from one another but can be accessed by the processing circuitry 205.

Software in memory 210 may include one or more separate programs, each of which includes an ordered listing of executable instructions for implementing logical functions. In the example of FIG. 2, the software in memory 210 includes the HMI 130 and mobile device authentication application 132 of FIG. 1, a suitable operating system (OS) 211, and various other applications 212. The OS 211 essentially controls the execution of computer programs, such as various modules as described herein, and provides scheduling, input-output control, file and data management, memory management, communication control and related services. Various user interfaces can be provided by the OS 211, the HMI 130, the mobile device authentication application 132, the other applications 212, or a combination thereof.

The HMI 130 and mobile device authentication application 132 may be implemented in the form of a source program, executable program (object code), script, or any other entity comprising a set of instructions to be performed. When a source program, then the program may be translated via a compiler, assembler, interpreter, or the like, which may or may not be included within the memory 210, so as to operate properly in conjunction with the OS 211. Furthermore, the HMI 130 and mobile device authentication application 132 can be written in an object oriented programming language, which has classes of data and methods, or a procedure programming language, which has routines, subroutines, and/or functions.

In exemplary embodiments, the input/output controller 235 receives inputs from input devices or touch-based inputs from the display 126 to detect touches, gestures, and/or movements when embodied as a multi-touch display configured to receive two or more touch-based inputs. Other input devices can include a keyboard, mouse, touchpad, and the like.

Other output devices such as the I/O devices 240, 245 may include input or output devices, for example but not limited to a printer, a scanner, a microphone, speakers, a secondary display, and the like. The I/O devices 240, 245 may further include devices that communicate both inputs and outputs, for instance but not limited to, components of a wireless interface such as a network interface card (NIC) or modulator/demodulator (for accessing other files, devices, systems, or a network), a radio frequency (RF) or other transceiver, infrared communication, Bluetooth, a telephonic interface, a bridge, a router, a mobile device, a portable memory storage device, and the like. The mobile device 122 can appear as an I/O device by interfacing the input/output controller 235 to a communication interface 265 of the mobile device 122. For example, the input/output controller 235 and the communication interface 265 can communicate by a wireless link 280 using any wireless format to communicate an authorization code 236 from the authorization station 102 to the mobile device 122. The wireless format of the wireless link 280 can be any form of communication that does not involve a wire, such as Wi-Fi, infrared, near-field communication, audible signals, RF, Bluetooth, and the like. As a further alternative, a wired link such as a universal serial bus (USB) cable (not depicted) can be used to provide the authorization code 236 from the authorization station 102 to the mobile device 122.

In exemplary embodiments, the system 200 can further include a network interface 250 for coupling to the control system network 114. The control system network 114 can be an internet protocol (IP)-based network for communication between the processing system 201 and other servers, processing systems, storage systems and the like via a broadband connection. As one example, the control system network 114 transmits and receives data between the processing system 201 and the secure server 112 of FIG. 1. The control system network 114 may be implemented in an optical, wired, and/or wireless fashion, e.g., using wireless protocols and technologies, such as WiFi, WiMax, etc. The control system network 114 can also be a packet-switched network or other similar type of network environment. The control system network 114 may be a fixed wireless network, a wireless local area network (LAN), a wireless wide area network (WAN), a personal area network (PAN), a virtual private network (VPN), intranet or other suitable network system and includes equipment for securely receiving and transmitting signals.

If the processing system 201 is a PC, workstation, intelligent device or the like, software in the memory 210 may further include a basic input output system (BIOS) (omitted for simplicity). The BIOS is a set of essential software routines that initialize and test hardware at startup, start the OS 211, and support the transfer of data among the hardware devices. The BIOS is stored in ROM so that the BIOS can be executed when the processing system 201 is activated.

When the processing system 201 is in operation, the processing circuitry 205 is configured to execute software stored within the memory 210, to communicate data to and from the memory 210, and to generally control operations of the processing system 201 pursuant to the software. The HMI 130, mobile device authentication application 132, OS 211, and applications 212 in whole or in part, but typically the latter, are read by the processing circuitry 205, perhaps buffered within the processing circuitry 205, and then executed.

When the systems and methods described herein are implemented in software, as is shown in FIG. 2, the methods can be stored on any computer readable medium, such as a local data storage system 218, for use by or in connection with any computer related system or method.

FIG. 2 also depicts an example of one of the mobile devices 122 of FIG. 1, that can include the communication interface 265, a camera interface 270, global positioning system (GPS) 275, the authentication key 133, an authentication application 285, a mobile HMI 290, and a camera 295 coupled to the camera interface 270. The authorization code 236 generated by the mobile device authentication application 132 can be provided to the mobile device 122 by one or more of: the wireless link 280 and a visual indication displayed, for instance, on the display 126. When the authorization code 236 is a visual indication, such as a bar code, a quick response (QR) code or other image type detectable by the camera 295 of the mobile device 122, the authorization code 236 may be displayed on the display 126 for a predetermined amount of time or until manually closed by an operator of the authorization station 102. The authentication application 285 interprets the authorization code 236 to extract and store the authentication key 133 with the address of the public-facing server 116 of FIG. 1. The authentication application 285 also interprets the authorization code 236 to configure access and protocol options for the mobile HMI 290.

Although the example of FIG. 2 depicts both the wireless link 280 and camera 295 for acquiring the authorization code 236, embodiments can omit either of these. For example, the authorization code 236 may be provided only by visual indication on the display 126 or only via the wireless link 280. Again, a wired link between the input/output controller 235 and the communication interface 265 can alternatively be used to provide the authorization code 236.

Figure 3:
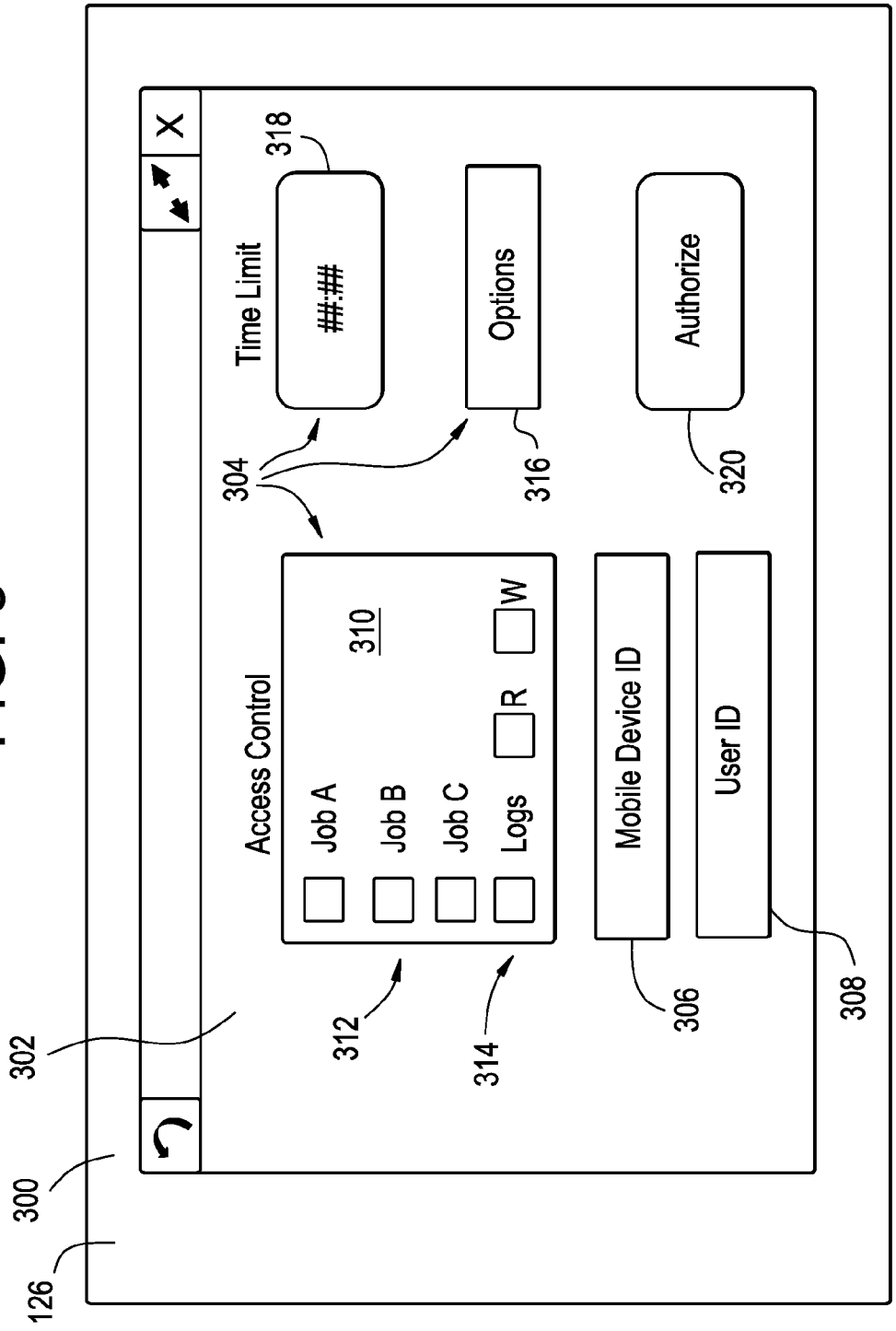
FIG. 3 depicts an example of a user interface of an authorization station.

FIG. 3 depicts an example of a user interface 300, which is interactively displayed on the display 126 of the authorization station 102 of FIG. 1. The mobile device authentication application 132 of FIG. 1 can provide a mobile device authentication interface 302 to establish authorization limits 304 for the mobile devices 122 of FIG. 1. An identifier 306 of the mobile device 122 can be assigned with a corresponding user identifier 308 for each of the mobile devices 122 being authorized for authentication. An access control list 310 can be used to assign access limits on the control system network 114 of FIG. 1 for a number of resources. There may be predefined limits for a number of resources that are grouped together as jobs 312. Jobs 312 may be assigned to constrain read/write access for one or more of: access to plant summary data, access to device maintenance data, access to plant documentation, access to specific sets of control system set points of the control system data 136 of FIG. 1, ability to change at least one of the control system set points, and access to maintenance logs.

Other features, such as specifying read/write access to particular logs or groups of logs 314 may be separately configurable. Additional or individual options 316 can be assigned as part of the authorization, including rules for revoking authorization, e.g., for use by the rules engine 115 of FIG. 1. A time limit 318 may establish a maximum amount of time for authorization to be active. The authorization limits 304 may be constrained by one or more of: a timeout period, a physical location of the mobile device 122 of FIG. 1, detected unusual activity, and local access to keep-alive messages. Upon establishing the authorization limits 304, an authorize button 320 can be selected to trigger generation of the authentication key 133 of FIG. 1 associated with the authorization limits 304. The authentication key 133 and the identifier 306 of the mobile device 122 are provided to the secure server 112 of FIG. 1 and stored in the authorization data 134. The authorization code 236 of FIG. 2 is generated and includes an encoded version of the authentication key 133 of FIG. 1 and an address of the public-facing server 116 of FIG. 1. The authorization code 236 of FIG. 2 may also encode options and access information for the authentication application 285 and mobile HMI 290 of FIG. 2.

Figure 4:
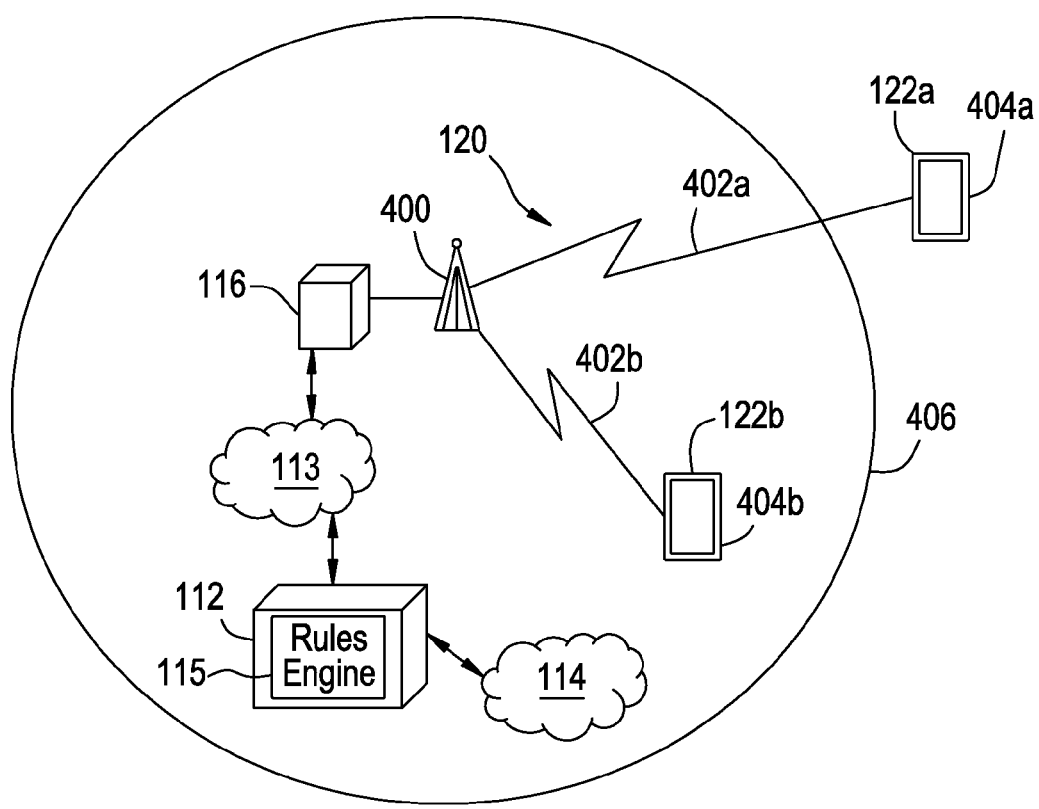
FIG. 4 depicts an example of location based access revocation.

FIG. 4 depicts an example of a location based access revocation according to an embodiment. The public-facing server 116 is configured to receive a request from the mobile devices 122, such as mobile device 122a, perform an initial authentication check of the request, forward the request to the secure server 112 via the perimeter network 113 based on determining that the request passes the initial authentication check of the request, and return data from the secure server 112 to the mobile device 122a. The secure server 112 is configured to receive the request from the public-facing server 116, perform a final authentication check of the request, access the control system network 114 to retrieve the data, and return the data to the public-facing server 116. The secure server 112 can apply authorization limits 304 of FIG. 3 to ensure that write requests and requested return data can be accessed by the mobile device 122a. The public network 120 may include a wireless interface 400 with wireless links 402a and 402b established for each authorized mobile device, such as mobile device 122a and 122b of FIG. 4.

Authorization to receive data from the control system network 114 can be constrained by physical locations of the mobile devices 122a and 122b. In the example of FIG. 4, mobile device 122a is at location 404a and mobile device 122b is at location 404b. A perimeter 406 can be defined, where mobile devices 122 going beyond the perimeter 406 lose authorization. For example, the GPS 275 of FIG. 2 can be used to determine that the mobile device 122a is beyond the perimeter 406. While the perimeter 406 of FIG. 4 appears circular, other shapes including irregular shapes can be defined for the perimeter 406.

The wireless interface 400 may also broadcast keep-alive messages on the wireless links 402a and 402b of FIG. 4, where the mobile devices 122a and 122b must respond within a timeout window or lose authorization. Each keep-alive message can be encrypted using the authentication key 133 of FIG. 1 associated with each of the mobile devices 122 and may contain a code that the mobile devices 122 must send back within a configurable timeout period. The mobile devices 122 receive the keep-alive messages so long as they are within range of the wireless interface 400 which can be different than the perimeter 406. Keep-alive messages complicate spoofing of the mobile devices 122 by other devices and prevent the mobile devices 122 from being removed, stolen, and used maliciously.

Other possible triggers for revocation include values of the control system data 136 of FIG. 1 and request history of the mobile devices 122. A rule employed by the rules engine 115, for example, may automatically lock out mobile devices 122 after a "High-High" alarm on a signal of one of the control subsystems 104 of FIG. 1. Combining multiple options for revocation further enhances security.

FIG. 5 depicts a process 500 for mobile device authentication in accordance with exemplary embodiments. The process 500 is described in reference to FIGS. 1-5. The process 500 begins at block 502 and transitions to block 504. At block 504, authorization limits 304 for a mobile device 122 are established. The authorization limits 304 can include, for example, one or more of: access to plant summary data, access to device maintenance data, access to plant documentation, access to specific sets of control system set points, ability to change at least one of the control system set points in the control system data 136, and access to maintenance logs. The authorization limits 304 may be further constrained by one or more of: a timeout period, a physical location of the mobile device 122, detected unusual activity, and local access to keep-alive messages.

At block 506, an authentication key 133 associated with the authorization limits 304 is generated. At block 508, the authentication key 133 and an identifier 306 of the mobile device 122 are provided to the secure server 112. At block 510, an authorization code 236 is generated including an encoded version of the authentication key 133 and an address of the public-facing server 116.

At block 512, the authorization code 236 is provided to the mobile device 122 to establish authentication for the mobile device 122 to receive data from the control system network 114 as constrained by the authorization limits 304. The authorization code 236 may be provided to the mobile device 122 by one or more of: the wireless link 280 and a visual indication on display 126. The visual indication on the display 126 can be one or more of: a bar code, a QR code, or other image detectable by the camera 295 of the mobile device 122. The process 500 ends at block 514.

The secure server 112 may be further configured to revoke access to the mobile device 122 based on one or more of: a timeout period expiring, a device identification failure, a user account authentication failure, an area of access, a role of access, and a control system state. Where the authorization limits 304 are separately defined for the identifier 306 of the mobile device 122 and the user identifier 308, the most restrictive version of the authorization limits 304 is applied. The area of access can be a particular physical location. A role of access can distinguish between various roles such as a maintenance operator, test operator, normal operator, and the like. The control system state may indicate whether the control subsystems 104 are being used in normal operation, test operation, maintenance operation, and the like. The authorization station 102 can be further configured to establish rules for the rules engine 115 to revoke access to the mobile device 122 based on one or more of: control system data 136 and request history of the mobile device 122.

An example sequence diagram 602 for providing mobile device authentication and retrieving data is depicted in FIG. 6. The example of FIG. 6 uses a QR code for the authorization code 236 of FIG. 2 for purposes of explanation; however, the sequence is not limited to the use of QR codes. A plant operator at authorization station 102 opens the mobile device authentication application 132 of FIG. 1 at action 604. At action 606, the plant operator at authorization station 102 selects authorization options to establish the authorization limits 304 of FIG. 3. A user of mobile device 122 opens a mobile application, such as authentication application 285 of FIG. 2, at action 608. The authorization station 102 displays a QR code as the authorization code 236 of FIG. 2 at action 610. At action 612, a user of mobile device 122 points the camera 295 of FIG. 2 at the display 126 with the QR code. At action 614, the mobile device 122 reads the QR code and extracts settings and the authentication key 133 of FIG. 1. At action 616, the mobile device 122 uses the settings and authentication key 133 to contact the public-facing server 116 with a request for data. The public-facing server 116 performs a first pass authentication of the request for data at action 618. Upon first pass authentication, the public-facing server 116 requests data from the secure server 112 through the perimeter network 113 at action 620. At action 622, the secure server 112 performs final authentication of the request and passes the request for data to the control system 105 to retrieve data via the control system network 114 of FIG. 1. At action 624, the secure server 112 returns the data through the perimeter network 113 to the public-facing server 116. At action 626, the public-facing server 116 returns the data to the mobile device 122.

In exemplary embodiments, a technical effect is providing mobile device authentication in a secured computing environment, such as a control system environment. Authentication can be performed through multiple levels of systems to insulate portions of the secured computing environment from unauthorized access attempts. Authorization limits and multiple revocation rules further enhance security and reduce risks associated with lost or stolen authorized devices. Encoding access limits with an authorization code can rapidly configure an authorized device to make appropriate access requests and apply the proper protocols when interfacing with the secured computing environment.

As will be appreciated by one skilled in the art, aspects of the present invention may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized including a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contains, or stores a program for use by or in connection with an instruction execution system, apparatus, or device.

Program code embodied on a computer readable medium as a non-transitory computer program product may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the authorization station 102 of FIG. 1 is implemented in hardware, the methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

While the invention has been described in detail in connection with only a limited number of embodiments, it should be readily understood that the invention is not limited to such disclosed embodiments. Rather, modifications can incorporate any number of variations, alterations, substitutions or equivalent arrangements not heretofore described, but which are commensurate with the spirit and scope of the invention. Additionally, while various embodiments have been described, it is to be understood that aspects may include only some of the described embodiments. Accordingly, the invention is not to be seen as limited by the foregoing description, but is only limited by the scope of the appended claims.

The invention claimed is:

1. A system for mobile device authentication, the system comprising:
    a public-facing server configured to interface with a mobile device; and a secure server configured to interface with the public-facing server via a perimeter network;
    and an authorization station configured to interface with the secure server via a control system network, the authorization station comprising processing circuitry configured to: establish authorization limits for the mobile device;
    generate an authentication key associated with the authorization limits;
    provide the authentication key and an identifier of the mobile device to the secure server;
    generate an authorization code comprising an encoded version of the authentication key and an address of the public-facing server; and
    provide the authorization code to the mobile device to establish authentication for the mobile device to receive data from the control system network as constrained by the authorization limits;
    wherein the public-facing server is configured to: receive a request from the mobile device, perform an initial authentication check of the request, forward the request to the secure server based on determining that the request passes the initial authentication check of the request, and return the data to the mobile device;
    wherein the authorization code is provided to the mobile device by a visual indication detectable by a camera of the mobile device.

2. The system according to claim 1, wherein the secure server is further configured to: receive the request from the public-facing server, perform a final authentication check of the request, access the control system network to retrieve the data, and return the data to the public-facing server.

3. The system according to claim 1, wherein the authorization limits comprise one or more of: access to plant summary data, access to device maintenance data, access to plant documentation, access to specific sets of control system set points, ability to change at least one of the control system set points, and access to maintenance logs.

4. The system according to claim 1, wherein the authorization limits are further constrained by one or more of: a timeout period, a physical location of the mobile device, detected unusual activity, and local access to keep-alive messages.

5. The system according to claim 1, wherein the secure server is further configured to revoke access to the mobile device based on one or more of: a timeout period expiring, a device identification failure, a user account authentication failure, an area of access, a role of access, and a control system state.

6. The system according to claim 1, wherein the secure server further comprises a rules engine, and the processing circuitry of the authorization station is further configured to establish rules for the rules engine to revoke access to the mobile device based on one or more of: control system data and request history of the mobile device.

7. A method for mobile device authentication, the method comprising:
  establishing, by processing circuitry of an authorization station, authorization limits for a mobile device, wherein the authorization station interfaces with a secure server via a
  control system network, the secure server interfaces with a public-facing server via a perimeter network, and the public-facing server interfaces with the mobile device;
  generating, by the processing circuitry, an authentication key associated with the authorization limits;
  providing the authentication key and an identifier of the mobile device to the secure server;
  generating an authorization code comprising an encoded version of the authentication key and an address of the public-facing server; and
  providing the authorization code to the mobile device to establish authentication for the mobile device to receive data from the control system network as constrained by the authorization limits;
  wherein the authorization limits comprise one or more of: access to plant summary data, access to device maintenance data, access to plant documentation, access to specific sets of control system set points, ability to change at least one of the control system set points, and access to maintenance logs;
  wherein the authorization code is provided to the mobile device by a visual indication detectable by a camera of the mobile device.

8. The method according to claim 7, further comprising:
  receiving a request at the public-facing server from the mobile device;
  performing an initial authentication check of the request;
  forwarding the request to the secure server based on determining that the request passes the initial authentication check of the request;
  performing a final authentication check of the request by the secure server;
  accessing the control system network to retrieve the data;
  returning the data from the secure server to the public-facing server; and
  returning the data from the public-facing server to the mobile device.

9. The method according to claim 7, wherein the authorization limits are further constrained by one or more of: a timeout period, a physical location of the mobile device, detected unusual activity, and local access to keep-alive messages.

10. The method according to claim 7, further comprising:
  revoking access to the mobile device based on one or more of: a timeout period expiring, a device identification failure, a user account authentication failure, an area of access, a role of access, and a control system state.

11. The method according to claim 7, wherein the secure server further comprises a rules engine, and the method further comprises establishing rules for the rules engine to revoke access to the mobile device based on one or more of: control system data and request history of the mobile device.

12. A computer program product for mobile device authentication, the computer program product including a non-transitory computer readable medium storing instructions for causing processing circuitry to implement a method, the method comprising:
  establishing authorization limits for a mobile device;
  generating an authentication key associated with the authorization limits;
  providing the authentication key and an identifier of the mobile device to a secure server;
  generating an authorization code comprising an encoded version of the authentication key and an address of a public-facing server; and
  providing the authorization code to the mobile device to establish authentication for the mobile device to receive data from a control system network as constrained by the authorization limits;
  wherein the authorization limits comprise one or more of: access to plant summary data, access to device maintenance data, access to plant documentation, access to specific sets of control system set points, ability to change at least one of the control system set points, and access to maintenance logs;
  wherein the authorization code is provided to the mobile device by a visual indication detectable by a camera of the mobile device.

13. The computer program product according to claim 12, wherein the authorization limits are further constrained by one or more of: a timeout period, a physical location of the mobile device, detected unusual activity, and local access to keep-alive messages.

14. The computer program product according to claim 12, wherein the secure server further comprises a rules engine, and the method further comprises establishing rules for the rules engine to revoke access to the mobile device based on one or more of: a timeout period expiring, a device identification failure, a user account authentication failure, an area of access, a role of access, a control system state, control system data and request history of the mobile device.

* * * * *